United States Patent
Xu

(10) Patent No.: US 8,579,523 B2
(45) Date of Patent: Nov. 12, 2013

(54) SYSTEM AND DEVICE FOR SECURING AND SECURELY TRANSPORTING A CAMERA

(76) Inventor: Ye Xu, Bellaire, TX (US)

(*) Notice: Subject to any disclaimer, the term of this patent is extended or adjusted under 35 U.S.C. 154(b) by 109 days.

(21) Appl. No.: 13/317,576

(22) Filed: Oct. 21, 2011

(65) Prior Publication Data
US 2013/0101278 A1     Apr. 25, 2013

(51) Int. Cl.
*G03B 7/00* (2006.01)
(52) U.S. Cl.
USPC .......................................................... 396/423
(58) Field of Classification Search
USPC ............................ 396/423; D16/243; D3/327
See application file for complete search history.

(56) References Cited

U.S. PATENT DOCUMENTS

| | | | |
|---|---|---|---|
| 817,207 A | 4/1906 | Wheeler | |
| 2,130,262 A | 9/1938 | Burlin | |
| 2,135,988 A | 11/1938 | Nagel | |
| 2,190,268 A | 2/1940 | Magid | |
| 2,480,662 A | 8/1949 | McKinzie | |
| 2,638,041 A * | 5/1953 | Horydczak | 396/423 |
| 3,061,965 A * | 11/1962 | Lewis | 42/85 |
| 3,437,029 A * | 4/1969 | Rydstedt | 294/139 |
| 3,559,853 A | 2/1971 | Strassman | |
| 3,608,794 A * | 9/1971 | Mazure | 224/255 |
| 3,861,070 A * | 1/1975 | Wild et al. | 42/85 |
| D234,442 S * | 3/1975 | Mazur | D16/243 |
| 3,870,209 A * | 3/1975 | Mazur | 224/255 |
| 3,984,855 A * | 10/1976 | Baczynsky | 396/423 |
| 4,136,726 A | 1/1979 | Lee | |
| 4,328,917 A * | 5/1982 | Reeberg | 224/254 |
| 4,396,137 A | 8/1983 | Benjamin | |
| 4,572,633 A | 2/1986 | Burke | |
| 4,714,184 A * | 12/1987 | Young et al. | 224/673 |
| 4,768,689 A | 9/1988 | Davis | |
| 4,868,954 A | 9/1989 | Kasai | |
| 5,065,919 A | 11/1991 | Sims | |
| 5,248,176 A | 9/1993 | Fredriksson | |
| 5,692,654 A * | 12/1997 | Bell | 224/150 |
| D532,201 S * | 11/2006 | Esch | D3/327 |
| 7,604,420 B2 * | 10/2009 | Moody et al. | 396/419 |

(Continued)

FOREIGN PATENT DOCUMENTS

| | | |
|---|---|---|
| JP | 2003-009930 | 1/2003 |
| JP | 2004320695 A | 11/2004 |

(Continued)

OTHER PUBLICATIONS

Novoflex QPL-AT2 ¼ Camera Plate with Twist Protection—R Strap compatible, EnjoyYourCamera.com, printed Apr. 5, 2013.*

(Continued)

*Primary Examiner* — Rodney Fuller
(74) *Attorney, Agent, or Firm* — Benjamin Aaron Adler

(57) ABSTRACT

Provided herein are systems for engaging and transporting a camera. The system comprises a mount plate, one or more mount plate connectors, a camera connector, a strap connector, and, optionally, a strap and camera. The mount plate engages the camera at one of the attachment means provided thereon via the camera connector and is configured to slidably receive a strap via one of the mount plate connectors which are threadably engaged with the mount plate and with a strap connector. Also provided is a device for engaging a camera for transport which comprises the mount plate, the mount plate connectors, the camera connector, and, optionally, the strap connector and the strap which are assembled as described.

14 Claims, 12 Drawing Sheets

(56) References Cited

U.S. PATENT DOCUMENTS

| | | | |
|---|---|---|---|
| 7,752,797 B1 * | 7/2010 | Swan | 42/85 |
| D623,861 S * | 9/2010 | Kope et al. | D3/327 |
| 7,814,697 B2 | 10/2010 | Esch | |
| 7,866,899 B2 | 1/2011 | Kope | |
| 8,047,729 B2 | 11/2011 | Kope | |
| D673,994 S * | 1/2013 | Geller | D16/243 |
| 2006/0208016 A1 * | 9/2006 | Esch | 224/150 |
| 2008/0061099 A1 | 3/2008 | Tilby | |
| 2008/0292303 A1 * | 11/2008 | Kope et al. | 396/423 |
| 2010/0284681 A1 * | 11/2010 | Kope et al. | 396/423 |
| 2011/0081143 A1 * | 4/2011 | Kope et al. | 396/423 |
| 2012/0014686 A1 * | 1/2012 | Kope et al. | 396/423 |
| 2012/0048901 A1 * | 3/2012 | Wong et al. | 224/257 |
| 2012/0305614 A1 * | 12/2012 | Lee | 224/545 |

FOREIGN PATENT DOCUMENTS

| | | |
|---|---|---|
| JP | 200565805 A | 3/2005 |
| JP | 2006-136636 | 6/2006 |
| NL | 1019969 | 8/2003 |

OTHER PUBLICATIONS

Novoflex Q=Plate WPL-AT2 ¼, Novoflex Price List, Mar. 15, 2007.*

Blackstrap FastenR-3 Adapter available for sale at least by Aug. 12, 2010, See BlackRapid.com, www.archive.org, Aug. 12, 2010.*

Spring Fix Linkages, www.springfixusa.com, www.archive.org, Feb. 2, 1010.*

Web advertisement, Get HOOKed! from www.leicagoodies.com/lehook.html, Jan. 9, 2013.

Neck Strap Attachment for Small Camera, Popular Science, vol. 128, No. 4, Apr. 1936, pp. 86-87.

* cited by examiner

SYSTEM AND DEVICE FOR SECURING AND SECURELY TRANSPORTING A CAMERA

BACKGROUND OF THE INVENTION

1. Field of the Invention

The present invention relates generally to the fields of photography and camera accessories or equipment. More specifically, the present invention relates to a system for securing and securely transporting a camera while providing ease of access thereto and use thereof.

2. Description of the Related Art

Photographers routinely carry their cameras with them to be ready for any opportune shot that occurs. However, this is often a trade-off between ease of access to the camera and safe and secure transportation thereof. One solution is to affix the camera to a strap, such as is worn over the shoulder and across the chest.

For example, a carabiner-like or other type of hooking or clipping mechanism can clip to a ring on the camera and receive a strap. Alternatively, U.S. Pat. No. 7,866,899 discloses a single coupler which has a threaded end and locknut at one end to screw into the camera and a strap attachment means through which the strap passes at the other end. However, all these types of coupling mechanisms allow the camera to swing and rotate. Moreover, with the coupler disclosed in U.S. Pat. No. 7,866,899 the swinging, twisting and handling the camera undergoes may cause the screw/locknut mechanism to loosen and wear out which leaves the camera unsecured and at risk of dropping. Furthermore, to mount the camera on a tripod or other stand, part or all of the coupling mechanism must be removed first. This is an inconvenience for the photographer and leaves the camera unsecured.

Thus, there is a recognized need in the art for improved means for safely carrying a camera Particularly, the prior art is deficient in systems, devices and methods for safely and securely transporting a camera without having to release the camera from the transport system for use. The present invention fulfills this longstanding need and desire in the art.

SUMMARY OF THE INVENTION

The present invention is directed to a system for camera transport. The system comprises a mount plate with a plurality of threaded openings and a slot therethrough and a strap connector having a connecting end and a strap receiving end configured to slidably receive a strap therethrough, one or more mount plate connectors and a camera connector. The one or more mount plate connectors each have a first threaded end configured to threadably engage one or more of the plurality of threaded openings and a second end configured to connect to the connecting end of the strap connector. The camera connector has a first threaded end configured to threadably engage a threaded camera attachment point on a camera through the slot. In a related invention, the camera transport system further comprises a strap slidably passed through the strap receiving end of the strap connector. In another related invention the camera transport system further comprises a camera threadably engaged with the mount plate through the slot via the threaded camera connector.

The present invention also is directed to a device for engaging a camera for transport thereof. The device comprises a mount plate having four threaded openings and a slot therethrough, a camera connector and at least one ball connector. The camera connector has a size and dimension to threadably engage a camera attachment point on a camera whereby the camera connector is threadably received through the slot. Each of the ball connectors has a first threaded end configured to threadably engage one of the threaded openings through the mount plate and a second ball end. In a related invention the device further comprises a strap connector with a connecting end configured to receive the ball end of the ball connector and with a strap receiving end configured to slidably receive a strap therethrough and the strap slidably passed through the strap receiving end.

The present invention is directed further to a system for engaging and transporting a camera. The system comprises a mount plate having four threaded openings and a slot therethrough, a camera connecting screw, at least one ball connector, a strap connector, a strap and the camera. The camera connecting screw has a size and dimension to threadably engage a camera attachment point on the camera through the slot. The camera connecting screw has a screw head with an upper surface that is level with an upper surface of the mount plate or recessed within the slot when the screw is threadably engaged with the camera attachment point. Each of the ball connectors has a first threaded end configured to threadably engage one of the threaded openings through the mount plate and a second ball end. The strap connector has a connecting socket end configured to receive the second ball end of one of the ball connectors and a strap receiving end configured to slidably receive a strap therethrough. The strap is slidably passed through the strap receiving end and the camera is threadably engaged with the mount plate.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIGS. 5A-5B depict the camera coupled to the system with the lens facing to the rear and to the front. FIGS. 5C-5D depict the user initially taking hold of the camera prior to raising it to take a picture and the user having raised the camera to his eye to take a picture.

DETAILED DESCRIPTION OF THE INVENTION

Figure 1A:
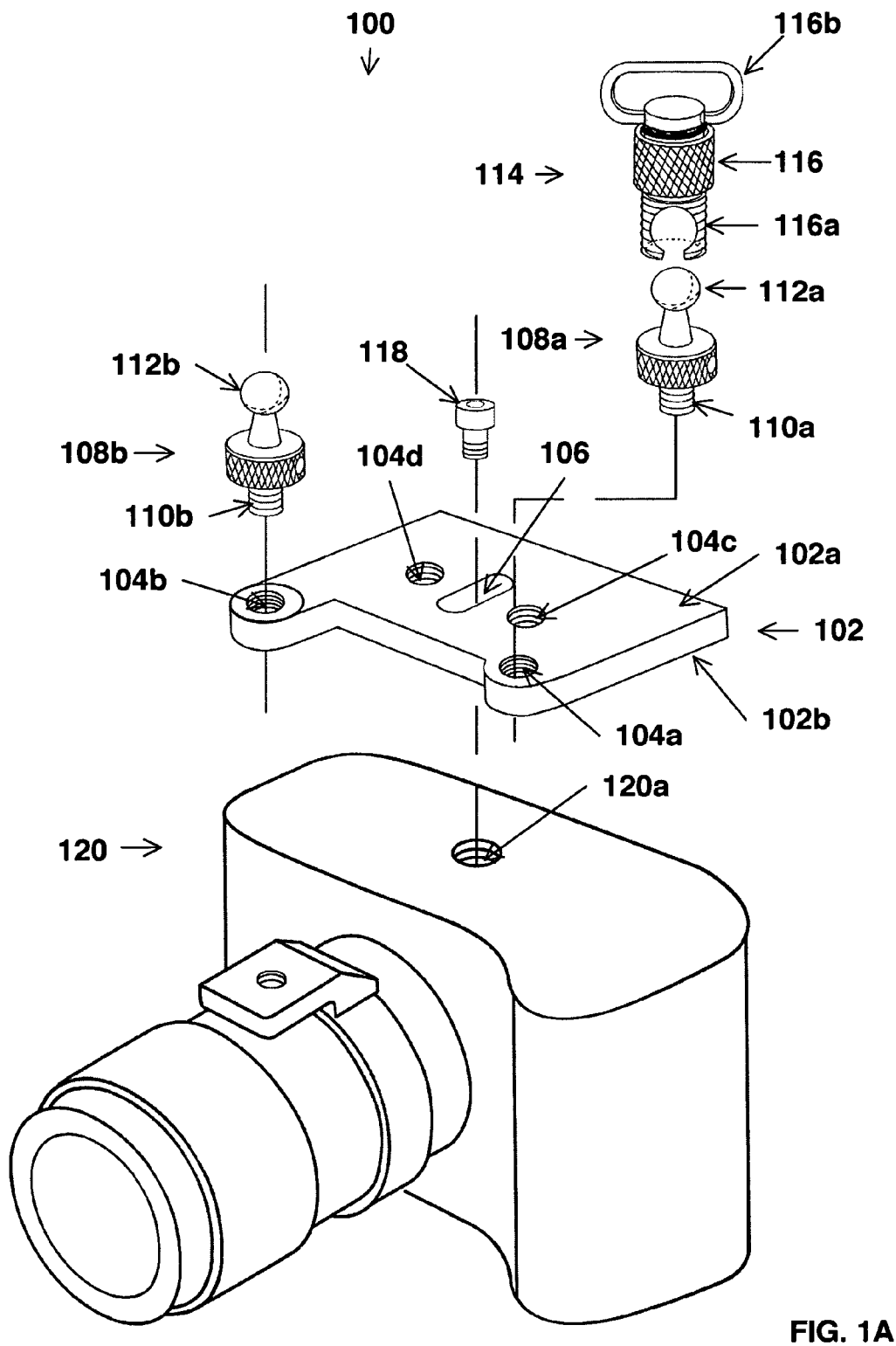
FIGS. 1A-1B are perspective views of an exploded assembly of a camera and mounting plate depicted with first and second ball connectors and strap connector (FIG. 1A) and without the first ball connector and strap connector (FIG. 1B) as aligned with a camera.

As used herein the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

In one embodiment of the present invention there is provided a system for camera transport, comprising a mount plate with a plurality of threaded openings and a slot therethrough; a strap connector having a connecting end and a strap receiving end configured to slidably receive a strap therethrough; one or more mount plate connectors each having a first threaded end configured to threadably engage one or more of the plurality of threaded openings and a second end configured to connect to the connecting end of the strap connector; and a camera connector having a first threaded end configured to threadably engage a threaded camera attachment point on a camera through the slot.

Further to this embodiment the camera transport system may comprise a strap slidably passed through the strap receiving end of the strap connector. In another further embodiment the camera transport system may comprise a camera threadably engaged with the mount plate through the slot via the threaded camera connector.

In all embodiments the mount plate may have a flat lower surface with a length and a width that are substantially accommodated by a bottom surface of the camera. In one aspect of these embodiments the mount plate slot may be centrally disposed through the mount plate where the mount plate may comprise four mount plate openings. In this aspect two of the mount plate openings may be disposed on either side of the mount plate slot and two of the mount plate openings may be disposed at opposite ends of a front edge of the mount plate. In another aspect of these embodiments the mount plate may comprise one or two ball connectors each having a threaded end and a ball end threadably engaged with one or two threaded mount plate openings; a strap connector with a socket connecting end connected to the ball end of one of the ball connectors and a strap receiving end through which a strap is slidably passed; and a screw configured to threadably engage the threaded camera attachment point through the mount plate slot. In this other aspect the two mount plate openings may be disposed at opposite ends of a front edge of the mount plate.

In all embodiments the one or more mount plate connectors may be ball connectors where the second end comprises a ball configured to connect to the connecting end of the strap connector. As such, the connecting end of the strap connector may be a socket configured to receive a ball end of a ball connector. Also, in all embodiments the camera connector may be a screw having a screw head with a size and dimension whereby an upper surface of the screw head is level with an upper surface of the mount plate or recessed within the slot when the screw is threadably engaged with the camera attachment point.

In another embodiment of the present invention there is provided a device for engaging a camera for transport thereof, comprising a mount plate having four threaded openings and a slot therethrough; a camera connector of a size and dimension to threadably engage a camera attachment point on a camera, said camera connector threadably received through the slot; and at least one ball connector having a first threaded end each configured to threadably engage one of the threaded openings through the mount plate and a second ball end.

Further to this embodiment the device comprises a strap connector having a connecting end configured to receive the ball end of the ball connector and a strap receiving end configured to slidably receive a strap therethrough; and the strap slidably passed through the strap receiving end. In both embodiments the mount plate slot may be centrally disposed through the mount plate. In one aspect two mount plate openings may be disposed on either side of the mount plate slot and two mount plate openings may be disposed at opposite ends of a front edge of the mount plate. Also in both embodiments, the mount plate has a flat lower surface with a length and a width that are substantially accommodated by a bottom surface of the camera.

In yet another embodiment of the present invention there is provided a system for engaging and transporting a camera, comprising a mount plate having four threaded openings and a slot therethrough; a camera connecting screw of a size and dimension to threadably engage a camera attachment point on a camera through the slot, said screw having a screw head with an upper surface that is level with an upper surface of the mount plate or recessed within the slot when the screw is threadably engaged with the camera attachment point; at least one ball connector having a first threaded end each configured to threadably engage one of the threaded openings through the mount plate and a second ball end; a strap connector having a connecting socket end configured to receive the second ball end of one of the ball connectors and a strap receiving end configured to slidably receive a strap therethrough; the strap slidably passed through the strap receiving end; and the camera threadably engaged with the mount plate.

In this embodiment the mount plate slot may be centrally disposed through the mount plate where two of the mount plate openings may be disposed on either side of the mount plate slot and two of the mount plate openings may be disposed at opposite ends of a front edge of the mount plate. Also, the mount plate may have a flat lower surface with a length and a width that are substantially accommodated by a bottom surface of the camera. In an aspect of this embodiment the mount plate may comprise a ball connector threadably engaged with one of the two mount plate openings on the front edge of the mount plate where the strap connector is connected to the ball end of one of the two ball connectors.

Provided herein are a device and system for carrying or transporting a camera. The system utilizes a camera mount plate device as a means to engage a camera at an attachment point generally used for mounting the camera onto a tripod or other stand. Moreover, the mount plate comprises separate means for engaging the camera and for slidably receiving a strap for carrying the same. This provides a more secure and safe method of transport without interfering with use of the camera by a user while allowing the camera to be comfortably positioned against the user either at rest or during transport. Furthermore, the secured camera may be mounted onto a tripod or other stand without having to disengage the camera from the mount plate.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

Figure 1B:
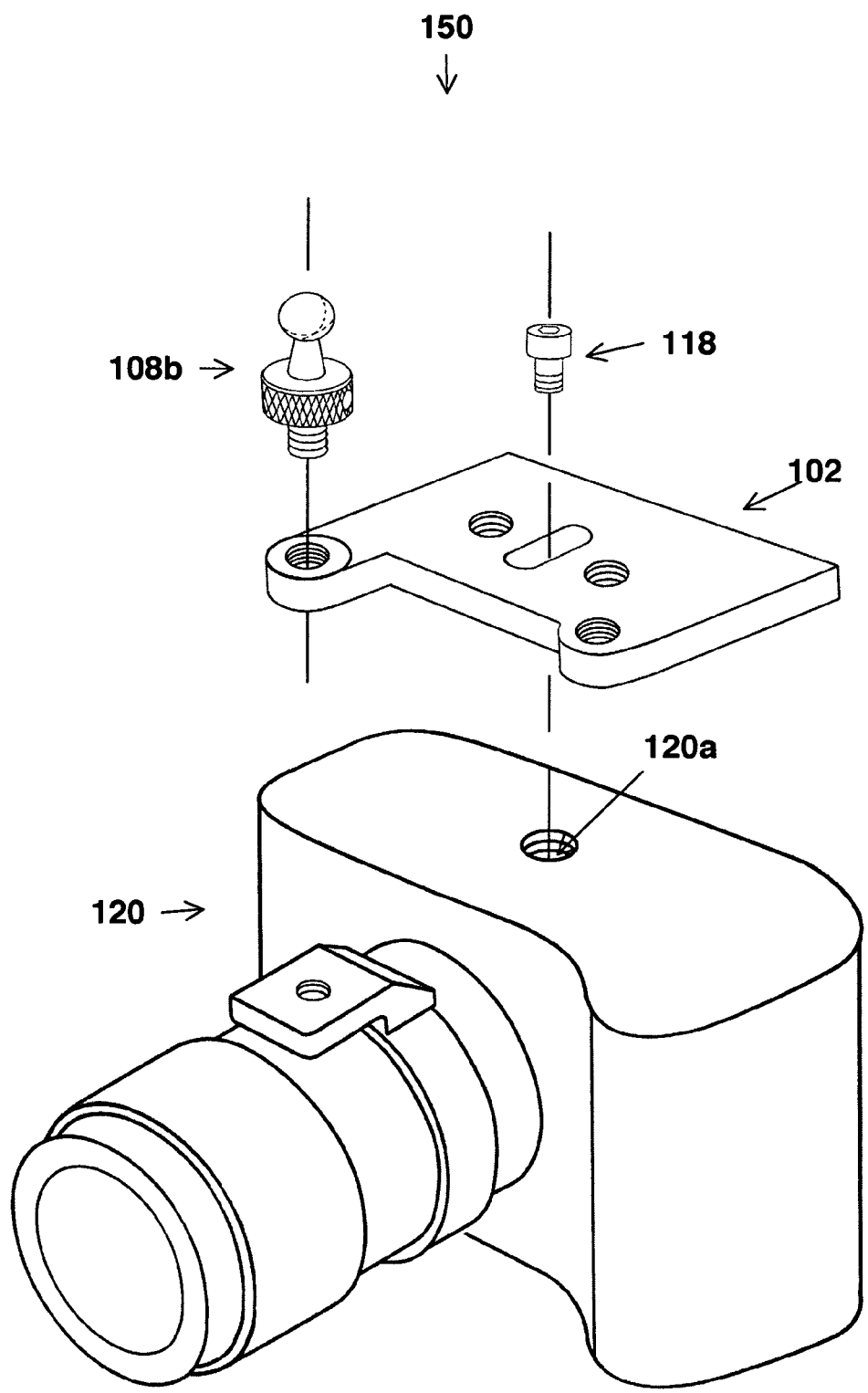

FIG. 1A is an exploded perspective view of the mount plate and the strap connector of the camera transport system 100 as it would be aligned to engage and to secure a camera. A mount plate 102 is shown and has an upper 102a and a lower 102b surface with a plurality of threaded openings 104a,b,c,d and a slot 106 therethrough. Threaded openings 104a,b are disposed at opposite ends of a front edge 102c and threaded opening 104c,d are disposed on either side and proximate to slot 106. First and second ball connectors 108a,b each have a threaded end with nut assembly 110a,b to threadably engage one of the threaded openings in the mount plate and a ball end 112a,b to connect to a strap connector 114. The strap connector comprises a sleeve 116 with a socket 116a configured to receive the ball of the ball connector at a first end and a strap receiving means 116b for slidably passing a strap 202 therethrough (see FIG. 2A) threadably engaged with the sleeve at a second end. A camera connecting screw 118 is configured to threadably engage the threaded camera attachment point 120a on the bottom surface of the camera typically provided for mounting the camera onto a tripod or other stand through the mount plate slot. With continued reference to FIG. 1A, FIG. 1B is an exploded perspective view 150 of the mount plate 102, camera connecting screw 118 and the second ball connector 110b as aligned with threaded camera attachment point 120a on the bottom surface of the camera 120.

The dimensions of the mount plate are determined by the dimensions of the bottom surface of the camera so that the lower surface area of the mount plate is flush with and substantially accommodated by the bottom surface of the camera. For example, although any surface area for the mount plate is encompassed by the invention, a representative areal dimensions of the mount plate may be, but are not limited to, about 7 cm to about 8 cm.

One or more of the ball connectors may be threaded into one or more of the mount plate openings and, when so engaged with the mount plate, the ball connector threaded end is flush with the lower 102b surface of the mount plate 102. Moreover, the strap connector may be connected to any ball connector 110a,b at any mount plate opening 104a,b,c,d. Preferably, the strap connector is connected to a ball connector that is itself threaded into one of the mount plate openings 104a,b. In addition, while the camera transport system described herein provides a secure means of transport that enables quick use of the camera without disengaging or releasing it from the system, including mounting the camera onto a tripod or other stand, a user who knows that the camera will not be used for a period of time, may utilize a second strap as an additional safety feature. For example, a second strap may be passed through the strap attachment end of a second strap connector engaged with a second ball connector on the mount plate. The second strap may hook to a belt loop or loop over a belt. This keeps the camera near the user and limits its motion during transport. Furthermore, the plurality of mount plate openings enables a camera to be simultaneously engaged with the mount plate and with a camera tripod or other stand, as are known in the art.

When the camera connecting screw 118 is threaded through the mount plate slot 106 into the threaded camera attachment point, the top surface of the screw head may be flush with the upper edge of the mount plate slot or recessed therein. This ensures that the screw remains securely fastened and will not be loosen over time. Loosening the camera connecting screw requires a tool, such as, depending on the type of screw head, a screwdriver, Allen wrench or hex key, as are well-known and standard in the art.

Figure 2A:
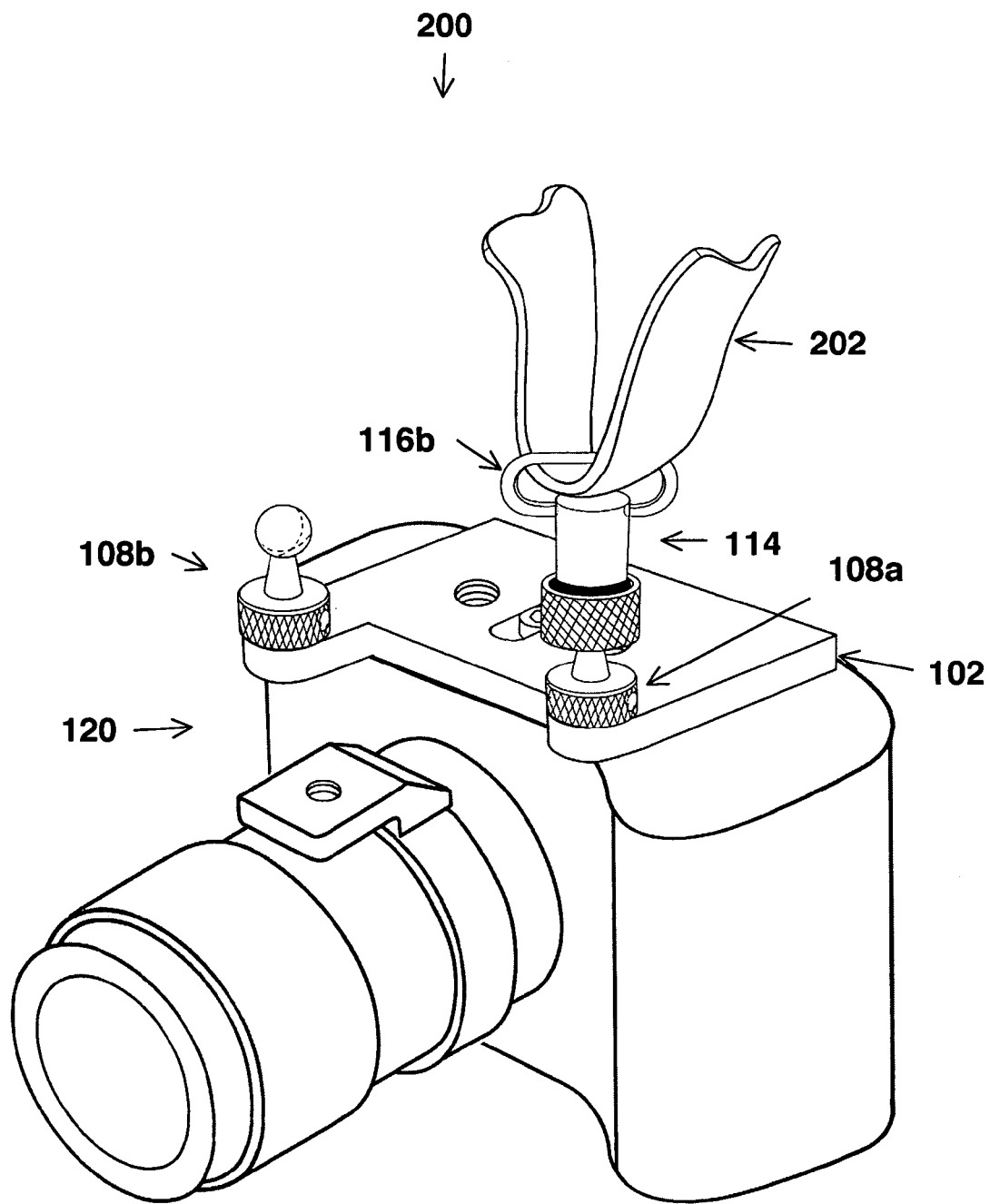
FIGS. 2A-2B are perspective views showing the system of FIG. 1A including a strap through the strap connector assembled via the first ball connector (FIG. 2A) and via the second ball connector (FIG. 2B).
Figure 2B:
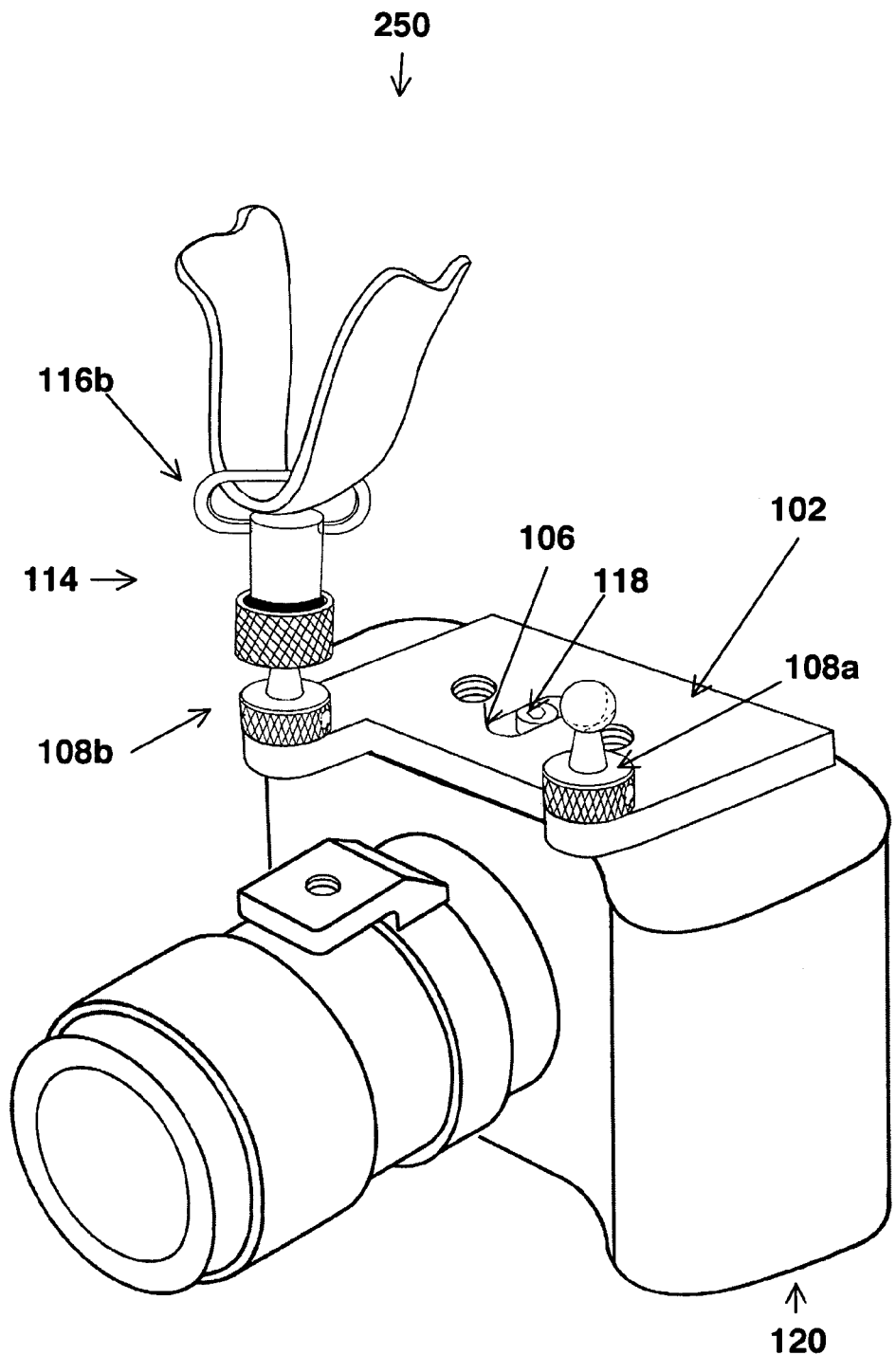

With continued reference to FIG. 1A, FIGS. 2A and 2B are front perspective views 200 and 250 of the assembled camera transport system 100. In these views, the lower surface 102b of the mount plate 102 is threadably engaged and in contact with the bottom surface of the camera 120 via the camera connecting screw 118 which is flush with the mount plate slot 106 as described for FIG. 1A-1B. The mount plate has two ball connectors 108a,b threaded into the mount plate openings 104a,b. A strap connector 114 depicting a portion of strap 202 slidably passing through the strap receiving end 116b is connected to ball connector 108a in FIG. 2A and is connected to ball connector 108b in FIG. 2B.

With continued reference to FIGS. 2A-2B, FIGS. 3A and 3B are perspective views 300 and 350 of the camera transport system in which the complete strap 202 is depicted slidably passing through the strap receiving end 116b of the strap connector 114. The strap connector is connected to ball connector 108a as described in FIG. 2A and is connected to ball connector 108b as described in FIG. 2B. The threadable engagement of the ball connectors 108a,b to the mount plate 102 and of the mount plate to the camera 120 is as described for FIGS. 2A-2B.

Figure 4A:
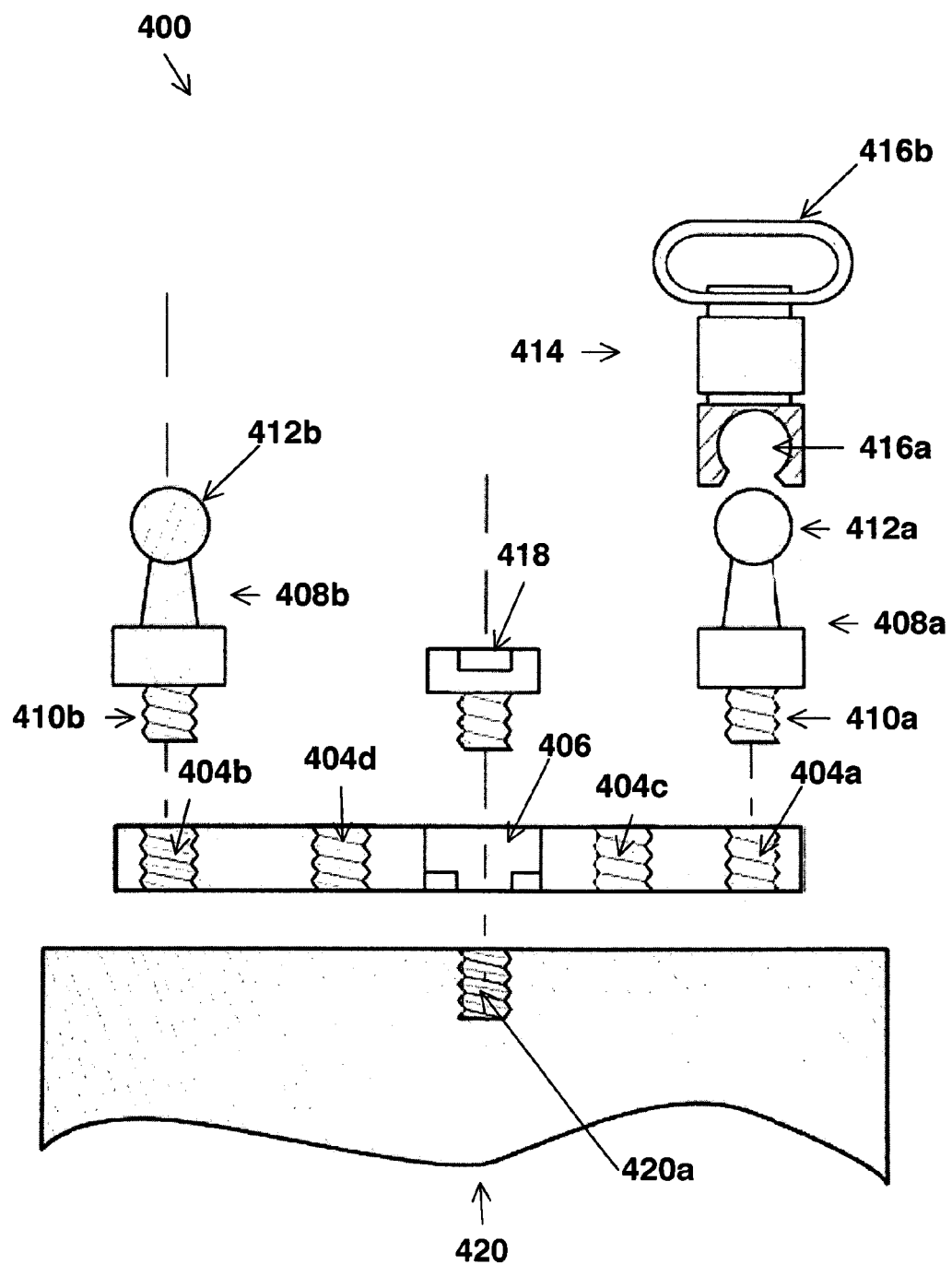
FIGS. 4A-4B are front cross-sectional views of the exploded assembly depicted in FIG. 1A and the perspective view of the assembled system shown in FIG. 2A.

With continued reference to FIG. 1A FIG. 4A is a cross-sectional view of the exploded assembly of the mount plate 402 with components shown in cross-section as aligned for engagement with the camera 420. The cross-section shows the plurality of threaded openings 404a,b.c,d on the mount plate 402 that receive the threaded ends 410a,b of the ball connectors 408a,b. The cross-section also depicts the strap connector 414 sleeve 416 showing the configuration of the socket 416a end to receive the ball end 412a of the ball connector and the configuration of the strap receiving end 416b to slidably receive the strap therethrough.

Figure 4B:
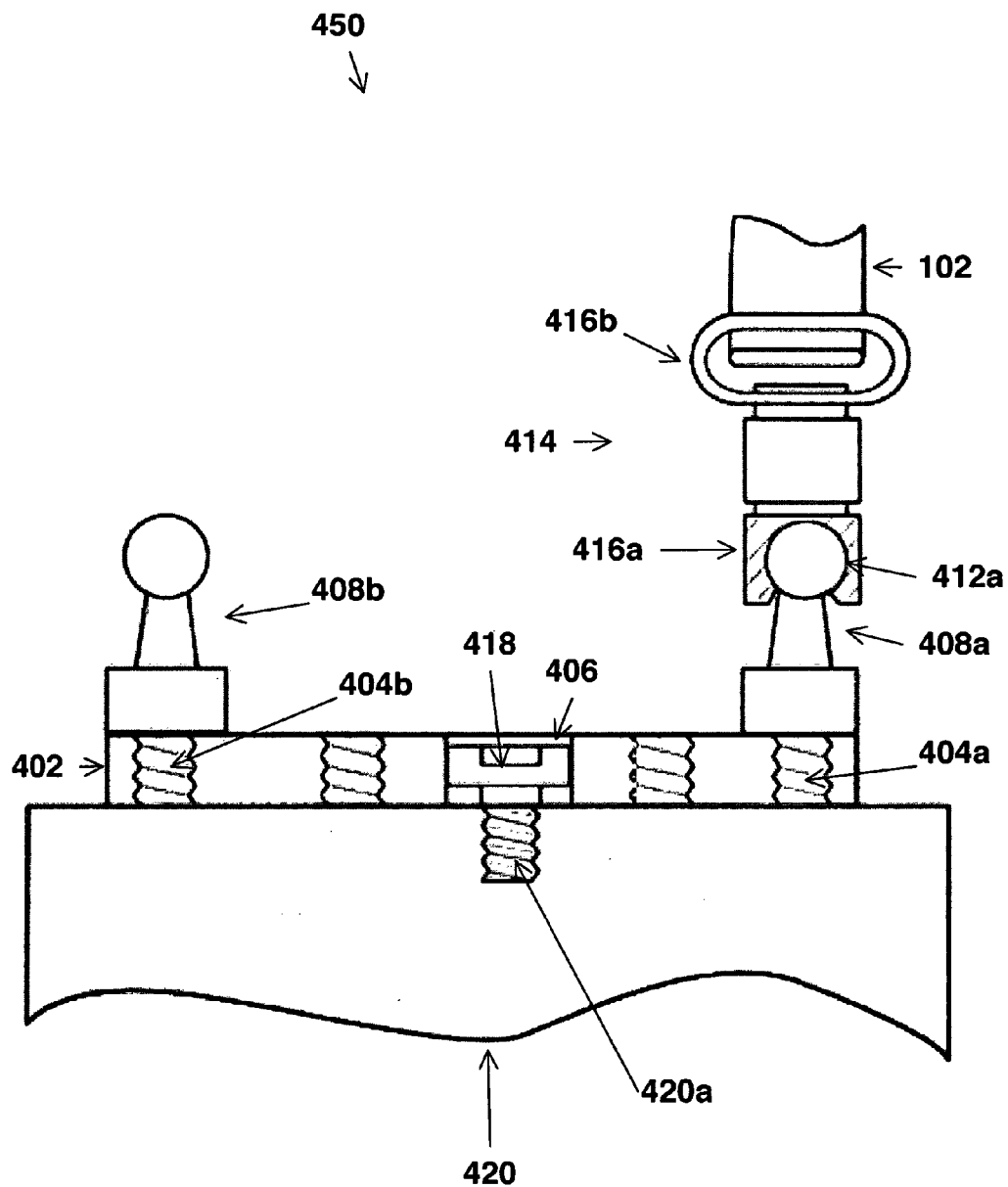

With continued reference to FIG. 2A FIG. 4B is a cross-sectional view 450 of the assembled mount plate 402 engaged with the camera 420. The cross-section shows how the ball connectors 408a,b are threadably received into the mount plate openings 404a,b. The cross-section also shows how the camera connecting screw 418 is threadably received into the camera attachment point 420a of the camera through the mount plate slot 406 and demonstrates that the screw head of the camera connecting screw is recessed within the slot for secure engagement. The cross-section further demonstrates how the ball end 412a of the ball connector 408a is received into the socket 416a of the strap connector 414 sleeve 416 and how a portion of the strap 402 slidably passes through the strap receiving end 416b of the sleeve.

Figure 3A:
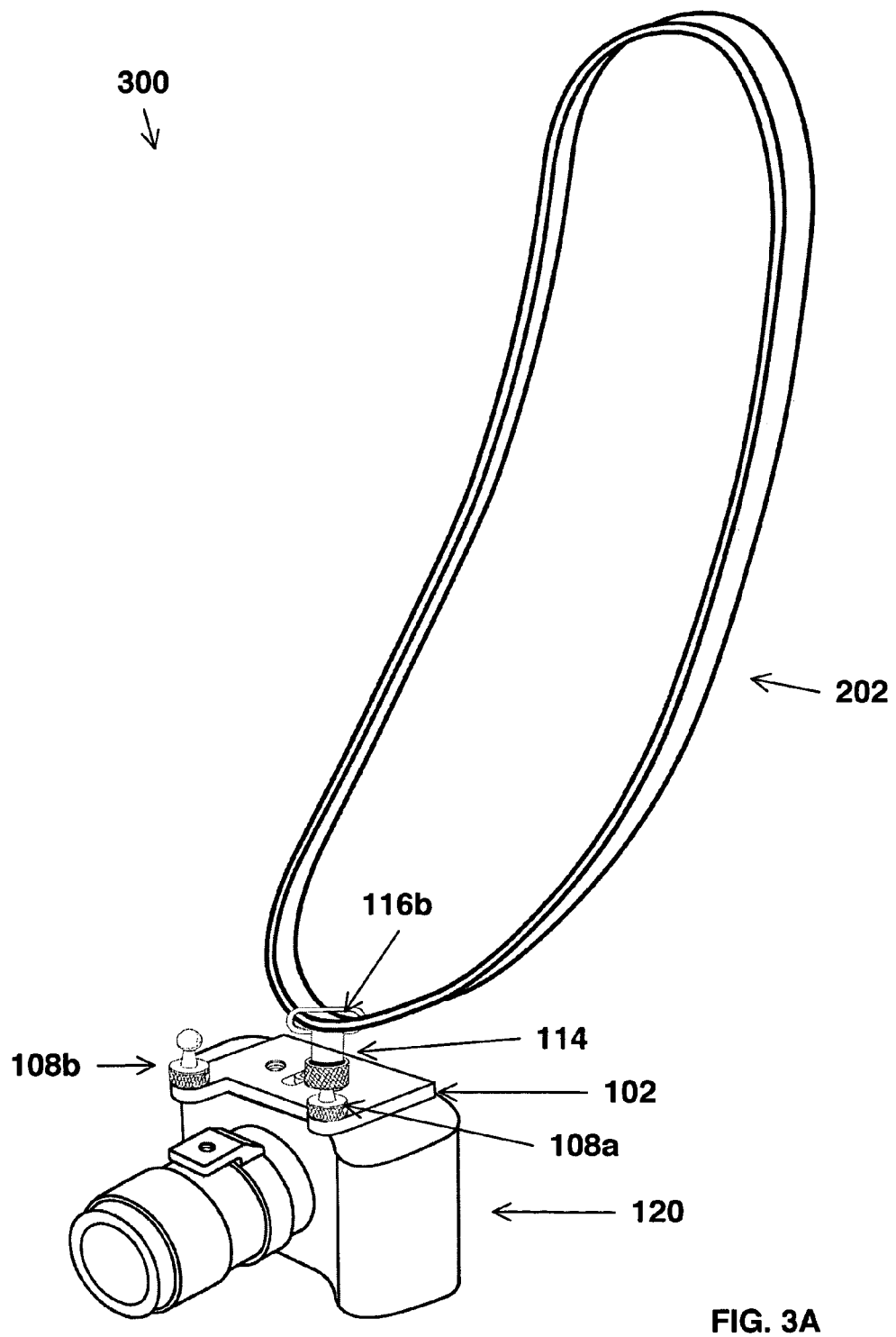
FIGS. 3A-3B are perspective views of FIGS. 2A-2B depicting a complete assembled transport system securing a camera.
Figure 3B:
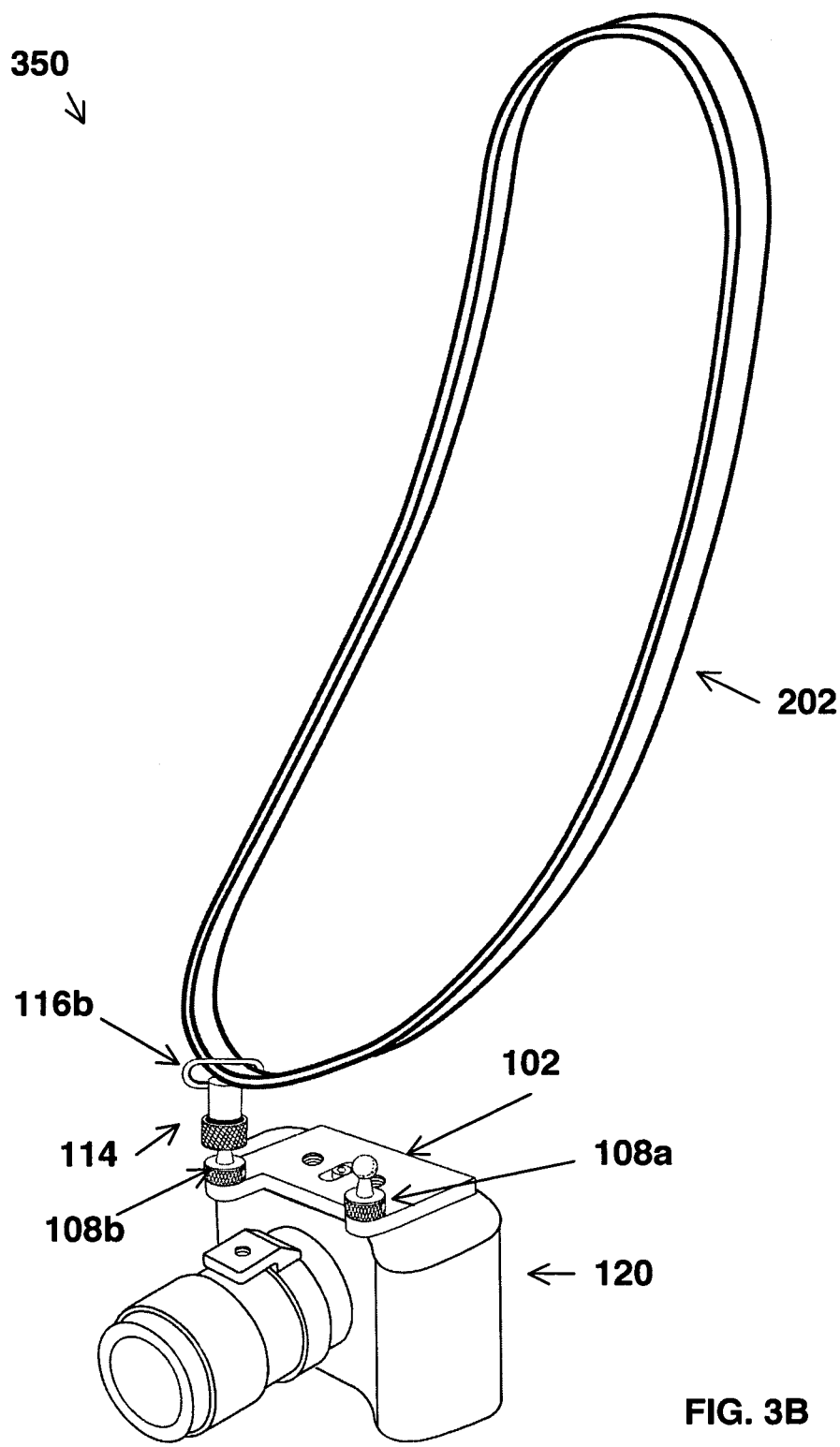

With continued reference to FIGS. 3A-3B, FIGS. 5A-5B depict the camera transport system in front plan views 500a,b, as worn and used by a user 501. The strap 202 may be worn over the shoulder 502a to cross the chest whereby the camera 120 engaged with the mount plate 102 rests in the area of the right hip 504b. The strap slidably passes through the strap receiving end 116b of the strap connector 114 and may be adjusted at 202a, for example, lengthened or shortened, as suits each individual user, so that the camera rests comfortably and securely against the user. Alternatively, the strap 202 may be of an unadjustable length, as shown in FIG. 5D. The camera transport system may engage the camera such that, when worn by the user 501, the camera is rearwardly facing at about hip level 504b at 506a, as in FIG. 5A, or forwardly facing at about hip level 504b at 506b, as in FIG. 5B. Moreover, although the strap connector is depicted connected to the ball end 112b of the ball connector 108b, the ball connector may be engaged with any of mount plate openings 104a,b,c,d. As depicted, the camera transport system is assembled for easier use by a right-handed person. As shown in FIG. 3A, if ball connector 108a is utilized to connect to the strap connector 114, the strap may be worn over shoulder 502b to cross the chest whereby the camera 120 rests against the area of the left hip 504aa of the user.

Figure 5A:
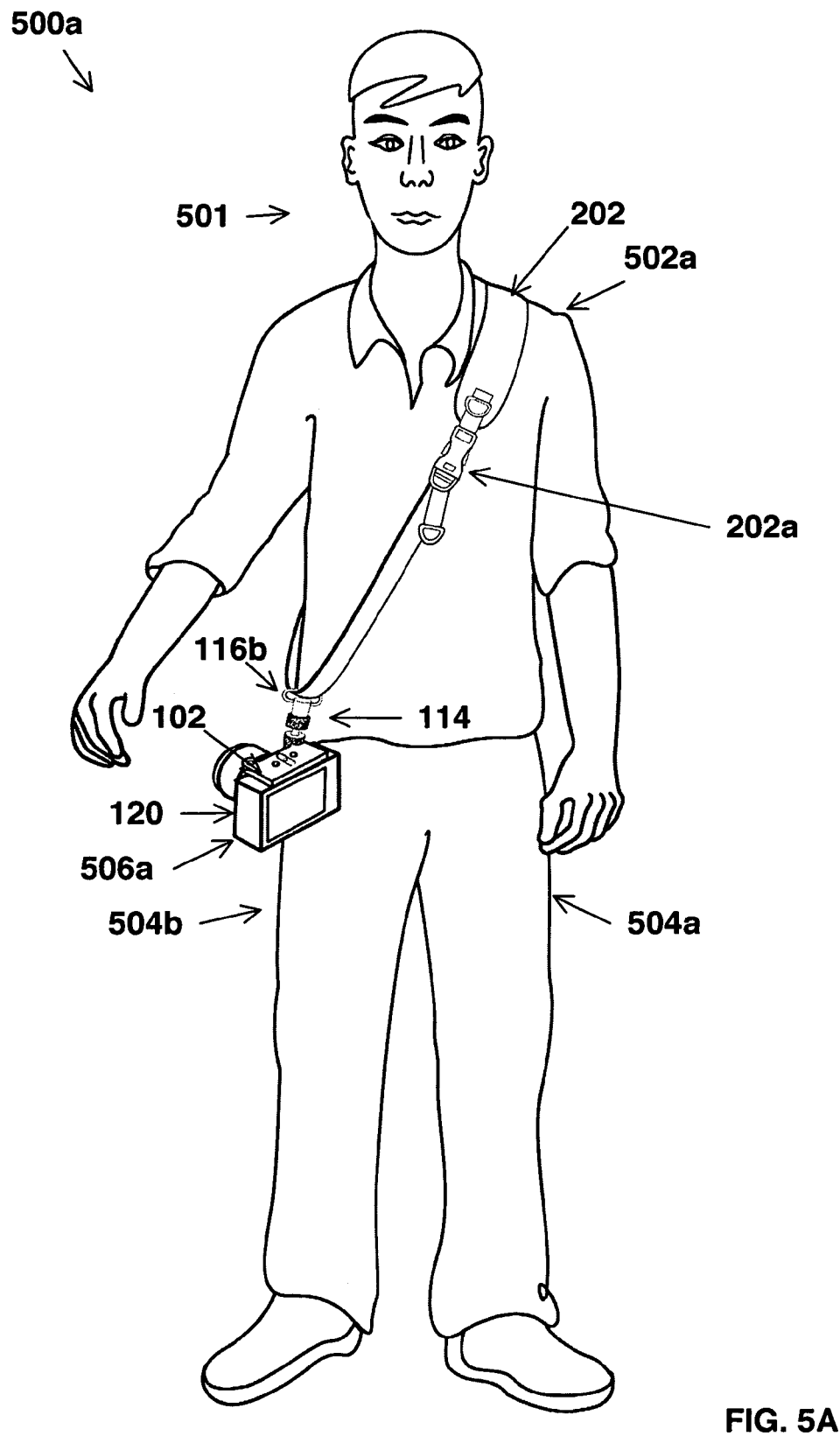
FIGS. 5A-5D depict the camera transport system with camera as worn by a user of the camera.
Figure 5B:
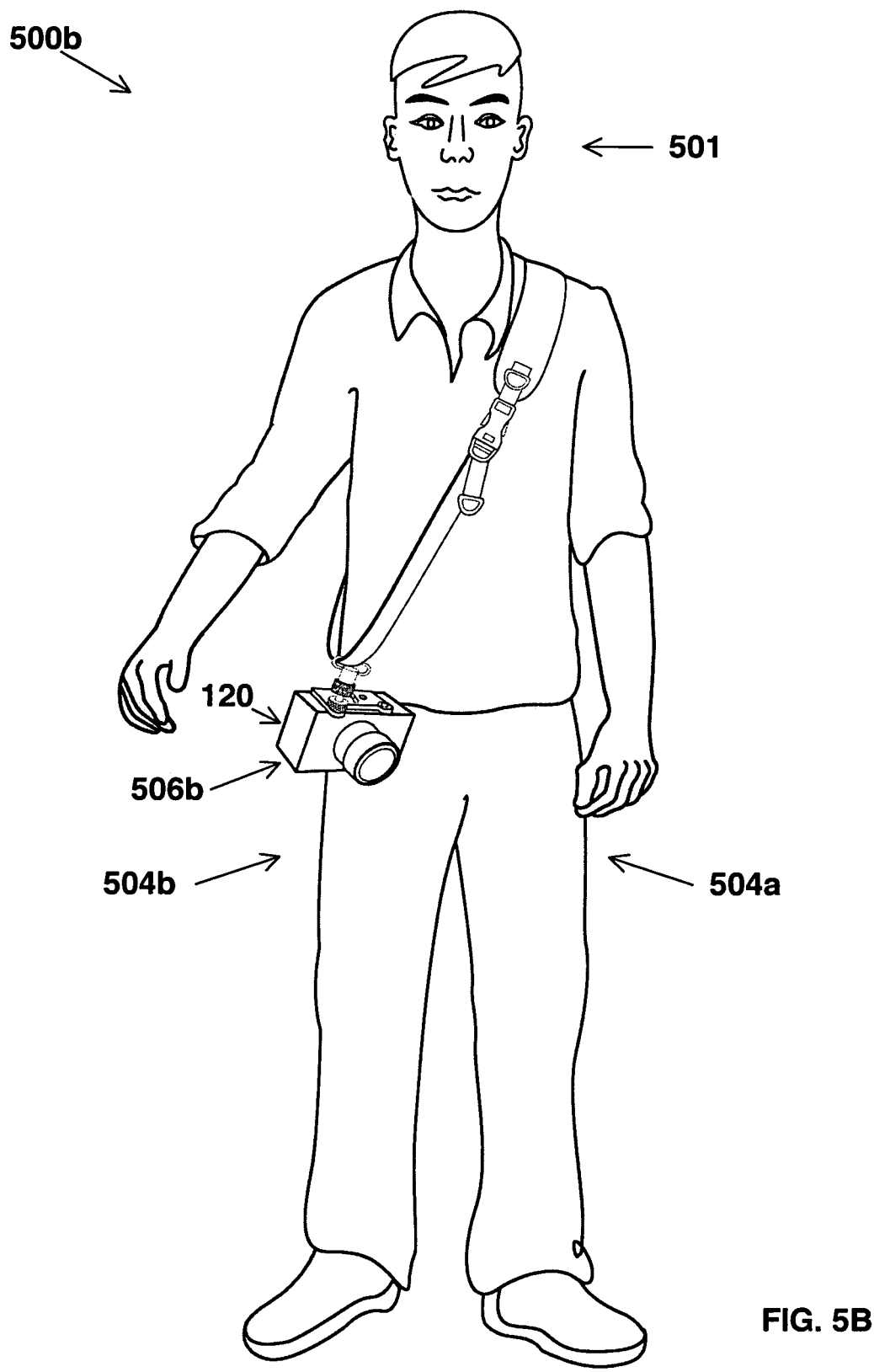
Figure 5C:
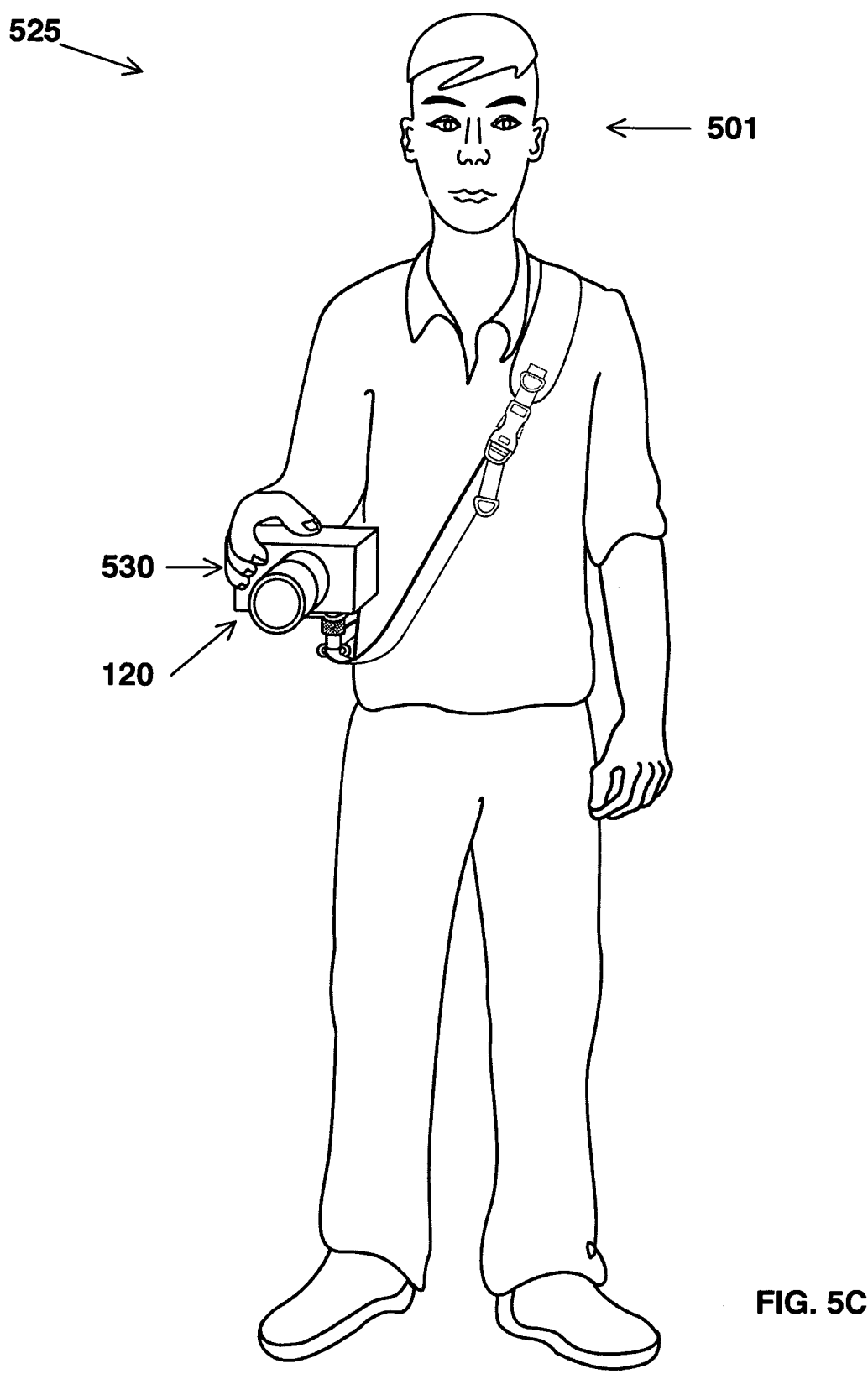
Figure 5D:
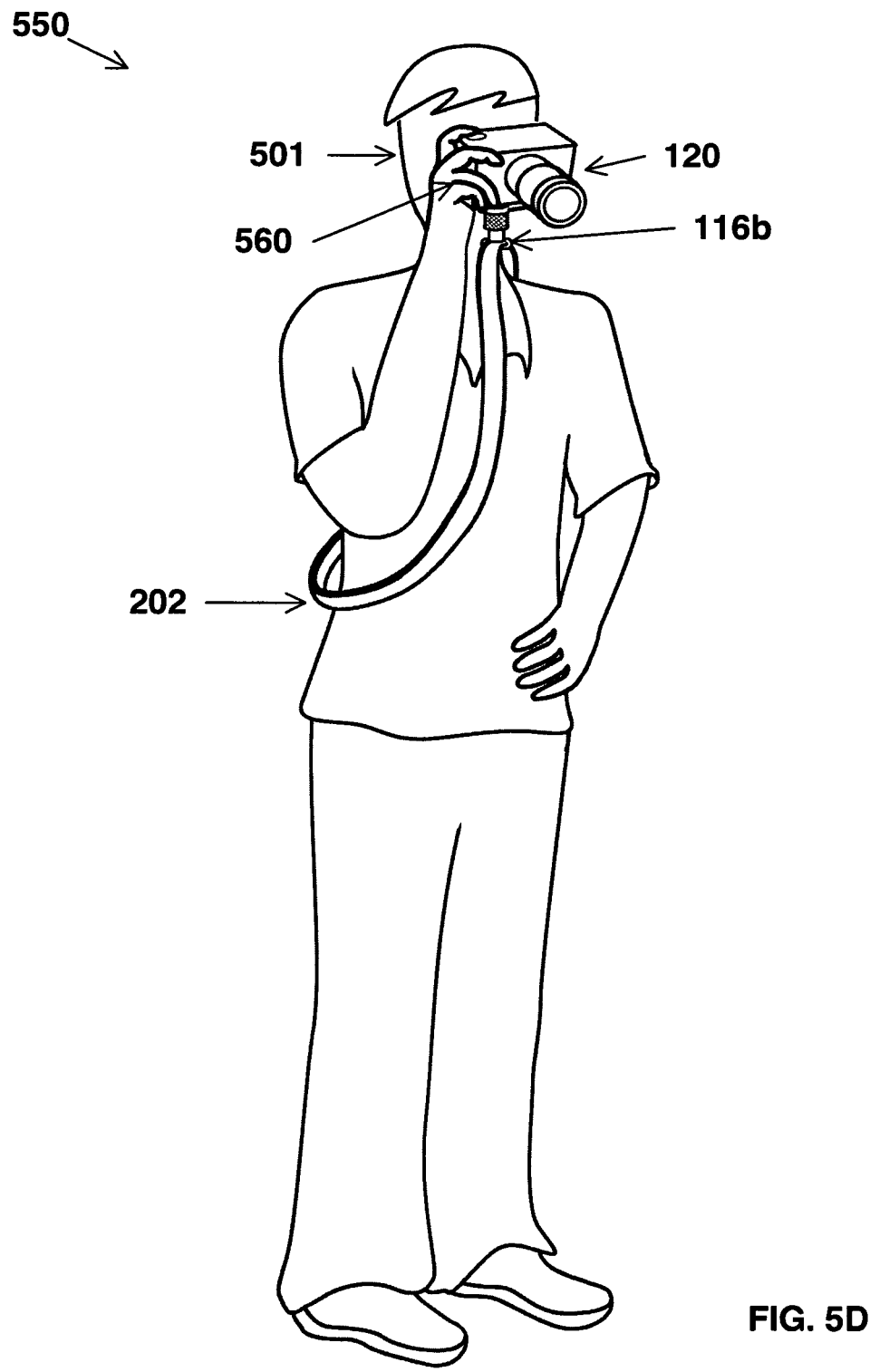

FIG. 5C is a front plan view 525 demonstrating that the user 501 can easily one-handedly grasp the camera 120 at 528, rotate it 180 degrees to hold the camera in correct orientation, i.e., the bottom of the camera is downwardly facing, and hold the camera in this orientation should the user either anticipate a photographic opportunity or in preparation to immediately take a picture. FIG. 5D is a front plan view 550 demonstrating the latter instance and showing that the user 501 has continued the upward motion to raise the camera to eye level at 560. Raising the camera to the eye may comprise one or both of sliding the strap receiving end 116b of the strap connector 114 along the length of the strap 202 or raising the camera to the eye at the position where the strap passes through the strap end. FIGS. 5A-5D clearly demonstrate that the camera can be used without having to release it from the camera transport system and that the camera transport system does not interfere with use thereof.

What is claimed is:

1. A system for camera transport, comprising:
   a mount plate with flat, parallel upper and lower surfaces consisting of:
      a slot disposed through the mount plate at the center thereof;
      two openings that are threaded therethrough disposed proximate to and directly on either side of the slot; and
      two openings that are threaded therethrough disposed at opposite ends of a front edge of the mount plate;
   a strap connector having a connecting end and a strap receiving end configured to slidably receive a strap therethrough;
   mount plate connectors each having a first threaded end configured to threadably engage the threaded openings on the upper surface and a second end configured to connect to the connecting end of the strap connector; and
   a camera connector having a first threaded end configured to threadably engage a threaded camera attachment point on a camera through the slot.

2. The system for camera transport of claim 1, further comprising a strap slidably passed through the strap receiving end of the strap connector.

3. The system for camera transport of claim 1, further comprising a camera threadably engaged with the mount plate through the slot via the threaded camera connector.

4. The system for camera transport of claim 1, wherein the flat lower surface of the mount plate has a length and a width that are substantially accommodated by a bottom surface of the camera.

5. The system for camera transport of claim 1, wherein the mount plate connectors are ball connectors, said second end comprising a ball configured to connect to the connecting end of the strap connector.

6. The system for camera transport of claim 1, wherein the connecting end of the strap connector is a socket configured to receive a ball end of a ball connector.

7. The system for camera transport of claim 1, wherein the camera connector is a screw having a screw head with a size and dimension whereby an upper surface of the screw head is level with an upper surface of the mount plate or recessed within the slot when the screw is threadably engaged with the camera attachment point.

8. The system for camera transport of claim 1, comprising:
   the mount plate;
   one or two ball connectors each having a threaded end and a ball end threadably engaged with one or two of the threaded mount plate openings;
   a strap connector with a socket connecting end connected to the ball end of one of the ball connectors and a strap receiving end through which a strap is slidably passed; and
   a screw configured to threadably engage the threaded camera attachment point through the mount plate slot.

9. A device for engaging a camera for transport thereof, comprising:
   a mount plate with flat, parallel upper and lower surfaces consisting of:
      a slot disposed through the mount plate at the center thereof;
      two openings that are threaded disposed proximate to and directly on either side of the slot; and
      two openings that are threaded therethrough disposed at opposite ends of a front edge of the mount plate;
   a camera connector of a size and dimension to threadably engage a camera attachment point on a camera, said camera connector threadably received through the slot; and
   at least one ball connector having a first threaded end each configured to threadably engage one of the threaded openings through the mount plate and a second ball end.

10. The device of claim 9, further comprising:
   a strap connector having a connecting end configured to receive the ball end of the ball connector and a strap receiving end configured to slidably receive a strap therethrough; and
   the strap slidably passed through the strap receiving end.

11. The device of claim 9, wherein the flat lower surface of the mount plate has a length and a width that are substantially accommodated by a bottom surface of the camera.

12. A system for engaging and transporting a camera, comprising:
   a mount plate with flat, parallel upper and lower surfaces consisting of:
      a slot disposed through the mount plate at the center thereof;
      two openings that are threaded therethrough disposed proximate to and directly on either side of the slot; and
      two openings that are threaded therethrough disposed at opposite ends of a front edge of the mount plate;
   a camera connecting screw of a size and dimension to threadably engage a camera attachment point on a camera through the slot, said screw having a screw head with an upper surface that is level with an upper surface of the mount plate or recessed within the slot when the screw is threadably engaged with the camera attachment point;
   at least one ball connector having a first threaded end each configured to threadably engage one of the threaded openings through the mount plate and a second ball end;
   a strap connector having a connecting socket end configured to receive the second ball end of one of the ball connectors and a strap receiving end configured to slidably receive a strap therethrough;
   the strap slidably passed through the strap receiving end; and
   the camera threadably engaged with and disposed against the flat lower surface of the mount plate.

13. The system of claim 12, wherein the flat lower surface of the mount plate has a length and a width that are substantially accommodated by a bottom surface of the camera.

14. The system of claim 12, wherein a ball connector is threadably engaged with one of the two mount plate openings on the front edge of the mount plate, said strap connector connected to the ball end of one of the two ball connectors.

* * * * *